Sept. 27, 1932.   H. W. KULP   1,879,332
ANIMAL FEEDING DEVICE
Filed Dec. 26, 1930
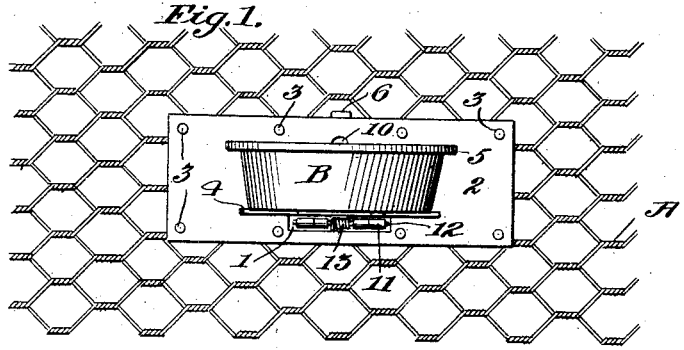
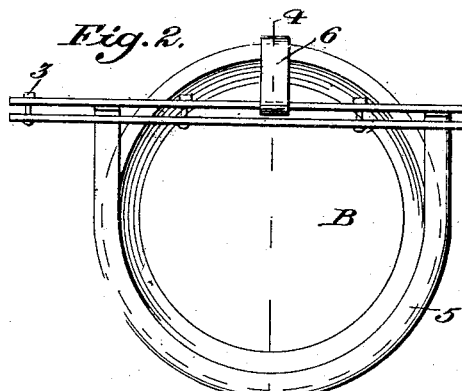
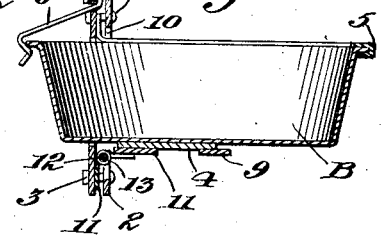
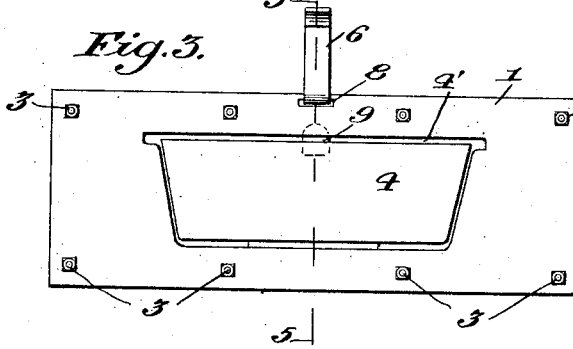
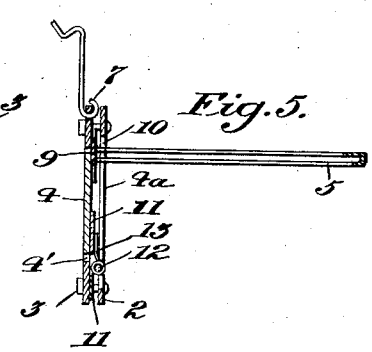
Inventor:
Harry W. Kulp,
by Richard E. Babcock
Att'y.

Patented Sept. 27, 1932

1,879,332

UNITED STATES PATENT OFFICE

HARRY W. KULP, OF LANCASTER, PENNSYLVANIA, ASSIGNOR OF ONE-HALF TO MARTIN C. DELLINGER, OF LANCASTER, PENNSYLVANIA

ANIMAL FEEDING DEVICE

Application filed December 26, 1930. Serial No. 504,928.

This invention relates to a feeding or watering device for animals from the outside of the animal pen or enclosure and is particularly intended for use on fox farms or ranches and for similar large farms for captive animals of various kinds.

On these farms the animals are more or less segregated in a large number of small pens and on large farms of this nature there are a great number of these small pens, each of which has to be individually supplied with food and water for its occupant or occupants. Heretofore it has been the usual practice for the attendants to go into the individual enclosures and leave the food and water in pans on the ground. This requires a great deal of time, particularly where there are a large number of individual pens and is a matter of decided expense and has been aggravated by the fact that animals often carry the pans to the far corners of the pens and frequently upset the pans with resultant large loss of food or food values. Furthermore, these pans are usually of light weight aluminum in order that a large number may be carried by a given attendant, and the animals, particularly on fox farms, play havoc with these aluminum pans. The foxes have very sharp front teeth and somehow seem to take a delight in gnawing on the edges and bottom corners of the pans with the result that a large number of the pans are regularly gnawed away, and their top flanges eaten off and the top portions torn into and are punctured around their bottom corners.

My invention has particularly in mind to overcome these disadvantages.

The primary object of my invention is to provide means for supporting the pan within the enclosure and permitting it to be easily inserted and withdrawn from the outside of the enclosure and to protect the top flange from the assaults of the foxes' teeth and to so present the lower bottom corners that the foxes will not be able to easily reach it with their teeth.

Further objects are to provide simple means for holding the pen in arranged position, to provide simple, self-acting means for closing the opening when the pan is withdrawn; and to provide a simple sheet metal construction readily lending itself to production on a large quantity basis by sheet metal stamping operations.

In the accompanying drawing:

Figure 1 represents a front elevation of a device embodying my invention as mounted on the wire of an individual pen;

Figure 2 represents a top plan view of the device by itself with a feeding pan therein;

Figure 3, a rear plan view of the device by itself, the feeding pan having been removed;

Figure 4, a sectional view on the line 4—4 of Figure 2;

Figure 5, a sectional view on the line 5—5 of Figure 3.

Referring now in detail to the drawing, A designates the usual wire netting employed as the sides of the pen, and B designates one of the usual light aluminum feeding pans having the usual outwardly extending radial top flange.

The clamping or mounting plates 1 and 2 are applied against opposite sides of the wire A, which is disposed between them and said plates are fastened together by means of cooperating nuts and bolts 3 passing through registering perforations in said plates 1 and 2.

The said plates 1 and 2 have their medial portions cut out as at 4' and 4a respectively to define an opening corresponding in size and shape to the cross sectional size and shape of the pan B, as shown, for instance, in Figure 4, to permit the insertion of the pan B through said plates 1 and 2 into the pen. To the plate 1 is secured a generally U-shape channeled member 5 projecting substantially at right angles from the face of plate 1 into the individual pen for a distance nearly equal to the diameter of the pan B. Said member 5 will be of such size and construction as to receive in its channel the upper or top edge flange of the pan B, and will be preferably of galvanized iron or steel so as to form an effective protection against the animals' teeth. Said member 5 may be attached or fastened or connected to the plate 1 in any suitable manner as by bolts or rivets or by spot welding; I prefer the spot welding as a means of attachment and that is the means employed in the embodiment illustrated.

A little sheet metal hook 6 extending through a slot 8 in the upper medial edge portion of the plate 1 and looped about and turning about the bar 7 thus defined, is adapted to engage with its hooked end under the rear portion of the top edge flange of the pan B to hold the same securely in proper position with the inner portion of its top edge flange inserted in and protected by the channeled member 5, and serves as an effective means guarding against the pan being shoved outward by the captive animal when eating food from the pan or by shoving against the outside of the pan and so definitely prevents exposure of the top edge flange of the pan B to attacks by the teeth of the animal at all times.

To guard against escaping of the animal through the opening when the pan B is removed, a sheet metal door or flap 4 is mounted by means of the hinge members 11 and 12 on the plate 1, a helical spring 13 being disposed about the pintle 12 of the hinge and bearing with one end against the plate 1 and with the other member against the hinge member 11 conected to the door 4. Said hinge members 11 may be connected to the flap or door 4 and the plate 1 in any usual and suitable manner, as by screws or rivets or by welding or spot welding; but I prefer to employ spot welding for this purpose and have employed spot welding in the embodiment illustrated. To prevent the door 4 from swinging through said opening to the rear of plate 1, a little stop finger or projection 9 is spot welded or otherwise suitably secured to the upper edge of door 4 and is so positioned as to strike against the material of plate 1 adjacent the medial portion of the top of the opening 4, and to permit the movement of the door 4 with its tongue 9 as above described, the medial upper edge of the opening 4a of plate 2 is cut out as at 10, as shown in Figs. 1, 4 and 5.

The pan B as positioned in the bracket or feeding device comprising this invention will, of course, be at such height as particularly suited to the convenient reach and feeding therefrom of the animals in the pens with which the device is to be used and consequently it would be very difficult for the animals to get any sort of purchase with their teeth on the bottom corner of the pans as held in the feeding position and as so held it is, of course, not possible for the animals to upset the pans or turn them over so as to present the bottom corners in such position that they could be easily gnawed or damaged by the animals' teeth. Of course, when the pan B is inserted in the device, as illustrated in Figures 1, 2 and 4, the flap or door 4 will be pressed against the bottom of said pan B by the spring 13, so that the pan B and its contents will be supported in part by the spring 13 through the medium of door 4.

Also the pan being definitely held in position, it will not be exposed to rough usage and even though the animal may shove his nose against the side or the bottom with considerable force or may stick his foot in the pan or jump about the pan and land with a foot in the pan, even in any such contingencies the pan cannot be badly bent, deformed or injured, since it not only is held in a fixed position, but also is held by its upper flange by the channeled element 5, which guards against said pan B being bent inwardly in one direction which would involve its lengthening at right angles thereto.

It is believed that the purposes, function and manner of use of the invention are very clear and easily understandable from the above, it being understood, of course, that the wire between the plates 1 and 2 and in registry with the registering opening 4′ and 4a is cut away to permit the insertion and withdrawal of the pan B.

Having thus described my invention what I claim as new and desire to secure by United States Letters Patent is:

1. A feeding device comprising a pair of apertured plates to be clamped together in registering relation on opposite faces of an intervening wire mesh constituting a side of an animal pen, means for clamping said plates together, and a pan having a radially outwardly presented flange extending from its upper edge, the registering apertures in said plates corresponding in shape to the cross section of said pan at its point of greatest diameter and being of such size as to permit the insertion and withdrawal of said pan through said apertures, in combination with a U-shaped channeled protective metal member having its ends anchored to one of said plates adjacent the upper ends of the sides of the aperture in said plate with the respective ends of the channel of said member so positioned as to receive the diametrically opposite portions of the flange of said pan to guide and protect said flange, a hook pivotally connected to one of said plates and having a portion to hook under the rear portion of said flange when said pan has been pushed forward in said channeled member to its extreme forward position, a metal flap, a hinge connected to said flap and one of said plates, a helical spring disposed about the pintle of said hinge and engaging said plate and said flap and acting to force said flap upward against the bottom of said pan to support the pan when in position and to force the flap upward into position substantially parallel with said plate to close the aperture therein when the pan is withdrawn, and a stop finger extending from the medial portion of the swinging edge of the flap to engage one of said plates to prevent said flap from swinging rearwardly through said registering apertures of said plates.

2. A feeding device comprising a pair of apertured plates to be clamped together in registering relation on opposite faces of an intervening wire mesh constituting a side of an animal pen, and means for clamping said plates together, in combination with a U-shaped channeled protective metal member having its ends anchored to one of said plates adjacent the upper ends of the sides of the aperture in said plate with the respective ends of the channel of said member so positioned as to receive the diametrically opposite portions of the flange of a receptacle to guide and protect said flange, a hook pivotally connected to one of said plates and having a portion to hook under the rear portion of said flange when the receptacle has been pushed forward in said channeled member to its extreme forward position, a metal flap, a hinge connected to said flap and one of said plates, a helical spring disposed about the pintle of said hinge and engaging said plate and said flap and acting to force said flap upward against the bottom of said pan to support the pan when in position and to force the flap upward into position substantially parallel with said plate to close the aperture therein when the pan is withdrawn.

3. A feeding device comprising a pair of apertured plates to be clamped together in registering relation on opposite faces of an intervening wire mesh constituting a side of an animal pen, and means for clamping said plates together, in combination with a U-shaped channeled protective metal member having its ends anchored to one of said plates adjacent the upper ends of the sides of the aperture in said plate with the respective ends of the channel of said member so positioned as to receive the diametrically opposite portions of the flange of a receptacle to guide and protect said flange, a hook pivotally connected to one of said plates and having a portion to hook under the rear portion of said flange when the receptacle has been pushed forward in said channeled member to its extreme forward position, a metal flap, means for movably connecting said flap to one of said plates, and yielding means for pressing said flap toward one of said plates.

4. A feeding device comprising a pair of apertured plates to be clamped together in registering relation on opposite faces of an intervening wire mesh constituting a side of an animal pen, and means for clamping said plates together, in combination with a channeled protective metal member having its ends anchored to one of said plates adjacent the upper ends of the sides of the aperture in said plate with the respective ends of the channel of said member so positioned as to receive opposite portions of the flange of a receptacle to guide and protect said flange, a metal flap, a hinge connected to said flap and one of said plates, and a spring engaging said plate and said flap and acting to force said flap upward.

5. A feeding device comprising an apertured plate to be mounted on the side of an animal pen, in combination with a channeled protective metal member having its ends anchored to said plate adjacent the upper ends of the sides of the aperture in said plate with the respective ends of the channel of said member so positioned as to receive opposite portions of the flange of a receptacle to guide and protect said flange, a metal flap, a hinge connected to said flap and said plate, and a spring engaging said plate and said flap and acting to force said flap upward.

6. A feeding device comprising an apertured plate to be mounted on the side of an animal pen, in combination with a channeled protective metal member having its ends anchored to said plate adjacent the upper ends of the sides of the aperture in said plate with the respective ends of the channel of said member so positioned as to receive opposite portions of the flange of a receptacle to guide and protect said flange, and a metal flap hingedly connected to said plate to close the aperture in said plate.

7. A feeding device comprising an apertured plate to be mounted on the side of an animal pen, in combination with a channeled protective metal member having its ends anchored to said plate adjacent the upper ends of the sides of the aperture in said plate with the respective ends of the channel of said member so positioned as to receive opposite portions of the flange of a receptacle to guide and protect said flange and means to positively engage such receptacle to prevent its displacement from said member.

In testimony whereof, I have signed my name to this specification at Lancaster, Pennsylvania, this 20th day of December, 1930.

HARRY W. KULP.